United States Patent [19]

Furukawa et al.

[11] 4,285,381
[45] Aug. 25, 1981

[54] CURABLE COMPOSITION FOR HARD RUBBER AND THE USE THEREOF

[75] Inventors: Hiroshi Furukawa, Kobe; Takehiko Tsuyuri, Ashiya, both of Japan

[73] Assignee: Sumitomo Rubber Industries, Ltd., Kobe, Japan

[21] Appl. No.: 158,314

[22] Filed: Jun. 10, 1980

[30] Foreign Application Priority Data

Jun. 18, 1979 [JP] Japan .................................. 54-77179

[51] Int. Cl.³ ............................................ B60C 15/06
[52] U.S. Cl. ......................... 152/362 R; 152/353 R; 152/374; 260/3; 525/138; 525/139
[58] Field of Search ............... 152/330 R, 353, 354 R, 152/362 R, 374; 260/3; 525/138, 139

[56] References Cited

U.S. PATENT DOCUMENTS

| | | | |
|---|---|---|---|
| 3,921,693 | 11/1975 | Suzuki et al. | 152/362 R |
| 3,937,862 | 2/1976 | Dillenschneider | 152/374 |
| 4,019,551 | 4/1977 | Kolowski | 152/354 |
| 4,067,373 | 1/1978 | Delobelle et al. | 152/374 |

FOREIGN PATENT DOCUMENTS

53-4059 1/1978 Japan .
53-4902 1/1978 Japan .

*Primary Examiner*—John E. Kittle

*Attorney, Agent, or Firm*—Armstrong, Nikaido, Marmelstein & Kubovcik

[57] ABSTRACT

A curable composition comprising (1) at least one rubber selected from the group consisting of natural rubber, a diene rubber and a diene copolymer rubber, (2) a sulfide resin as a curing agent having the following general formula:

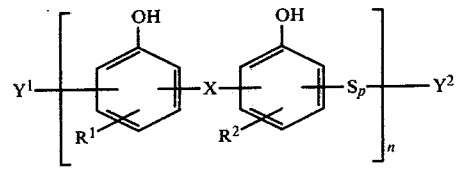

wherein X is methylene group, ethylene group, —S— or —S—S—, $R^1$ and $R^2$ are independently a $C_{1-10}$ alkyl or alkylene group, $Y^1$ and $Y^2$ are independently the residue of a phenol compound, p is an integer of 2 to 8, and n is an integer of 2 to 5, (3) a phenolic thermosetting resin and (4) a hardener for hardening said thermosetting resin. The composition shows a low viscosity upon milling and also does not take place scorching and blooming, and can provide a cured rubber having a high dynamic modulus of elasticity with improved workability and processability. The cured rubber is suitable for use in radial tires as bead filler rubber.

3 Claims, 2 Drawing Figures

CURABLE COMPOSITION FOR HARD RUBBER AND THE USE THEREOF

BACKGROUND OF THE INVENTION

The present invention relates to a curable rubber composition and the use thereof, and more particularly to a curable composition for providing a hard rubber having a high dynamic modulus of elasticity with improved processability and workability and a radial tire using the hard rubber as a bead filler.

In general, a radial tire has a structure in which, as shown in FIG. 1, cords of carcass ply 1 are arranged parallel to each other in the radial direction of the tire, that is, transversely to the equator plane of the tire, the carcass ply 1 being turned up at its both ends outwardly from the inside of bead wire 2 disposed concentrically with the tire on both sides thereof, and a bead filler rubber 3 is provided inside the turned-up end portion of the carcass ply, the bead filler rubber 3 extending from a location just above the bead wire 2 toward the side wall of the tire. In the tire of such a structure, there might be created a gap of rigidity due to tire structure in the neighborhood of the top of the turned-up end portion 1a of the carcass ply at bead 6, resulting in occurrence of cracks in the circumferential direction of the tire along the gap.

In order to prevent the occurrence of such a damage at the bead, it has been proposed to use a hard rubber having a high dynamic modulus of elasticity of more than 300 kg./cm.$^2$ as the bead filler rubber 3. However, production of a cured rubber having such a high dynamic modulus of elasticity in a factory has involved many problems on workability and processability. In a conventional process for producing a hard rubber having a high elasticity, it has been a common practice to use a large amount of thermosetting resin, a large amount of a curing agent, a large amount of a curing accelerator or a combination thereof in order to increase the density of crosslinkage. However, such a process has a problem of rubber scorching due to voluminous heat generation at the time of milling a rubber composition by a Banbury mixer, or of impairing the tackiness of rubber due to blooming of the curing agent upon processing. Also, because of high viscosity of the rubber composition, there would be produced excessive load upon milling or extrusion.

Accordingly, it is an object of the present invention to provide a curable composition having improved processability and workability.

A further object of the present invention is to provide a curable composition capable of giving a hard rubber having a high dynamic modulus of elasticity.

Another object of the present invention is to provide a radial tire using the hard rubber as the bead filler rubber.

These and other objects of the invention will become apparent from the description hereinafter.

SUMMARY OF THE INVENTION

In accordance with the present invention, there is provided a curable composition comprising (1) at least one rubber selected from the group consisting of natural rubber, a diene rubber and a diene copolymer rubber, (2) a sulfide resin as a curing agent having the following general formula:

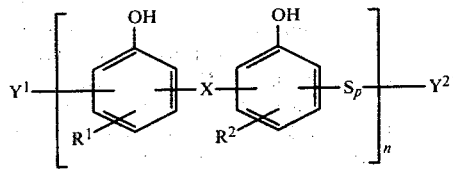

wherein X is methylene group, ethylene group, —S— or —S—S—, $R^1$ and $R^2$ are independently a $C_{1-10}$ alkyl or alkylene group, $Y^1$ and $Y^2$ are independently the residue of a phenol compound, p is an integer of 2 to 8, and n is an integer of 2 to 5, (3) a phenolic thermosetting resin and (4) a hardener for hardening said thermosetting resin.

The composition of the present invention does not take place the blooming of the curing agent and also shows a reduced Mooney viscosity and, therefore, can be readily processed with an improved workability. The hard rubber prepared from the composition of the present invention is very suited for use as the bead filler of radial tires, and by the use of the hard rubber according to the present invention, there can be prevented separation of the turned-up end portion of the carcass ply from a rubber surrounding it at the bead, occurrence of cracks in the circumferential direction at the bead, wear of the carcass ply due to frictional contact with the rim and damage due to heat generation, and moreover "softness" or "riding comfortability" required particularly in radial tires is improved.

DETAILED DESCRIPTION

Figure 1:
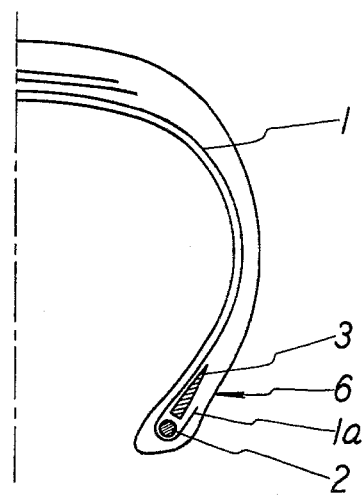
FIG. 1 is a partial section view of a conventional radial tire.

As the rubber component of the composition of the present invention, there are employed natural rubber, diene type synthetic rubbers such as cis-1,4-polyisoprene and cis-1,4-polybutadiene rubbers and diene copolymer rubbers such as styrene-butadiene copolymer. These rubber materials may be employed alone or in admixture thereof in any proportions. Particularly, it is preferred to use natural rubber and cis-1,4-polybutadiene rubber alone or in admixture thereof in any proportions.

In the present invention, a sulfide resin of the following general formula:

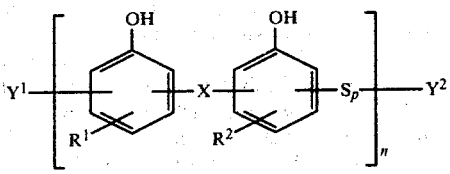

wherein X is methylene group, ethylene group, —S— or —S—S—, $R^1$ and $R^2$ are independently a $C_{1-10}$ alkyl or alkylene group, $Y^1$ and $Y^2$ are independently the residue of a phenol compound, p is an integer of 2 to 8, and n is an integer of 2 to 5, is employed as a curing agent. In the above formula, X is methylene group, ethylene group, —S— or —S—S—, and methylene group is preferred. Also, $R^1$ and $R^2$ are each a $C_{1-10}$ alkyl or alkylene group, and are bonded to the benzene ring at the ortho-, meta- or para-position with respect to the hydroxyl group. The alkyl groups are those shown by the general formula: $C_mH_{2m-1}$— wherein m is an integer of 1 to 10, and the alkylene groups are those shown by the general formula: $C_mH_{2m-1}$—, $C_mH_{2m-3}$, $C_mH_{2m-5}$—, or $C_mH_{2m-7}$— wherein m is an integer of 1 to 10. A $C_8$ alkyl or alkylene group is preferred, since a particularly excellent effect is produced. Also, in order to activate the —$S_p$— linkage bonding to the benzene ring, it is desirable to increase the proportion of the sulfide resin in which the $R^1$ and $R^2$ groups are bonded to the benzene ring at the ortho- or para-position.

In the above formula, n is an integer of 2 to 5, preferably 2 to 4, and the sulfide resin usually employed as the curing agent is in the form of a mixture of those having n of 2 to 5. Also, p in $S_p$ is an integer of 2 to 8, and —$S_2$— linkage is preferred.

Phenol, cresol, resorcin or a derivative of these compounds is usually bonded to the ends of the sulfide resin employed in the present invention. Representative examples of such a phenol compound bonding to the ends of the sulfide resin are, for instance, phenol, o-cresol, m-cresol, p-cresol, 2,3-xylenol, 2,4-xylenol, 2,5-xylenol, 2,6-xylenol, 3,5-xylenol, p-tert-butylphenol, p-tert-acylphenol, 4-isopropyl-m-cresol, thymol, catechol, resorcin, hydroquinone, salicylic acid, aminophenol and bisphenol.

The sulfide resin employed in the present invention can be prepared, for instance, by adding 0.5 to 1 mole of a methylene donor such as hexamethylenetetramine and 0.5 to 1 mole of a phenol compound to the reaction product of 0.5 to 1 mole of the above-mentioned phenol compound and 0.5 to 1 mole of sulfur monochloride, and reacting them.

The sulfide resins preferably employed in the present invention are shown by the following general formula:

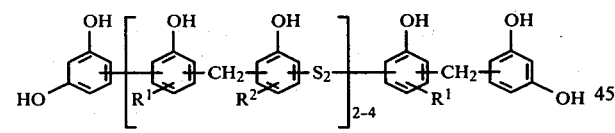

wherein $R^1$ and $R^2$ are as defined above.

As apparent from the molecular structure of the sulfide resin, the —$S_p$— linkage bonding to the benzene ring is activated by the hydroxyl groups and alkyl or alkylene groups which bond to the respective benzene rings in the ortho- or para-position relationship with each other, to cause cleavage of the —S—S— linkages, and these —S—S— linkages act on the double bonds of the rubber molecules to give rise to crosslinkage. The sulfide resin is preferably used in combination with sulfur which has been popularly employed as a curing agent heretofore, since the density of crosslinkage of rubber can be further increased. Also, by selecting a proper mixing ratio of the sulfide resin and sulfur, it is possible to moderately adjust the scorch time and to more surely prevent occurrence of the blooming of the curing agent. The ratio of the sulfide resin to sulfur is usually selected from the sulfide resin: sulfur=0.2 to 10.0:1.0, preferably 1.0 to 3.0:1.0.

The amount of the sulfide resin is selected from 0.1 to 10 parts by weight, preferably 1 to 5 parts by weight, per 100 parts by weight of the rubber material. When the amount of the sulfide resin is less than 0.1 part by weight, no satisfactory effect is obtained, and when the amount exceeds 10 parts by weight, physical properties of the obtained cured rubber such as elongation at breaking and strength at breaking are lowered.

A thermosetting resin is employed in the present invention in order to increase the dynamic modulus of elasticity of the cured rubber. The thermosetting resins used in the present invention are phenolic thermosetting resin such as phenol resins, cresol resins and modified resins thereof. Examples of the modified phenolic resins of the phenol resins and the cresol resins are resins capable of being hardened with heat, e.g. cashew varnish modified resins, oil modified resins such as a resin modified with an oil such as linolic acid, linolenic acid or oleic acid, alkylbenzene modified phenolic resins such as a resin modified with an alkylbenzene such as xylene, epoxy modified resins, aniline modified resins, melamine modified resins, lignin modified resins, coumarone modified resins. These thermosetting resins may be used either singly or in admixture thereof in any proportions. The thermosetting resin is incorporated in the composition in an amount of 5 to 40 parts by weight, preferably 10 to 25 parts by weight, per 100 parts by weight of the rubber material. When the amount of the thermosetting resin is less than 5 parts by weight, the dynamic modulus of elasticity cannot be sufficiently increased, and when the amount is more than 40 parts by weight, the viscosity of the composition at the time of blending or extruding becomes high to badly affect the workability and processability.

The hardener used in the present invention is a compound which is capable of hardening the thermosetting resin and can donate methylene when heated under a usual curing condition at a temperature of 40° to 200° C., i.e. a methylene donor. Examples of the hardener are hexamethylenetetramine, polyfunctional methylolmelamine derivatives, oxazolidine, oxazolidine derivatives, bis(1,3-oxazolidine) and bis(1,3-oxazolidine) derivatives. The amount of the hardener is selected from 0.5 to 6 parts by weight per 100 parts by weight of the rubber material. When the amount is less than 0.5 part, hardening is insufficient, and when the amount is more than 6 parts, the cured rubber having excellent physical properties such as high dynamic modulus of elasticity is not obtained, because unreacted hardener remains. When the combination of the oxazolidine derivative of the following formula:

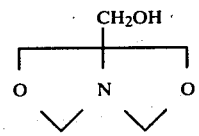

with other hardener is employed, processability of the composition and physical properties of the cured rubber are further improved.

The feature of the present invention resides in combined use of the above-mentioned particular sulfide resin and the hardener. That is to say, the sulfide resin used in the present invention not only has curing activity in itself and serves as a curing agent, but also acts as a thermosetting resin. Therefore, when the sulfide resin is used in combination with a thermosetting resin of other kind as mentioned above, the processability of the rubber composition in the uncured state is appreciably improved. Moreover, the cured rubber has a uniform crosslinkage, and the physical properties of the cured rubber is synergistically improved.

The rubber composition of the present invention may be suitably incorporated with other additives which are usually used in rubber blends, for example, filler such as carbon or silica, reinforcing agent, softener, antioxidant, curing accelerator, and plasticizer.

The composition of the present invention can be milled in a usual manner without causing any trouble such as scorching and excessive load. By curing the composition of the present invention in a usual manner, there can be obtained a cured rubber having a high dynamic modulus of elasticity without impairing various properties such as flex cracking resistance and heat build-up. For instance, the composition is press-cured at a temperature of 40° to 200° C. for 30 minutes to 3 hours under pressure.

The cured rubber obtained according to the present invention is suitable for use as the bead filler rubber of radial tires. When the cured rubber is used as the bead filler rubber, there can be prevented separation of the turned-up end of the carcass ply from a rubber surrounding it at the bead, cracking in the circumferencial direction at the bead and wear of tire due to rubbing friction with the rim and also the "riding comfortability" or "softness" of the tire can be further improved.

The radial tire according to the present invention is described below with reference to the accompanying drawing.

Figure 2:
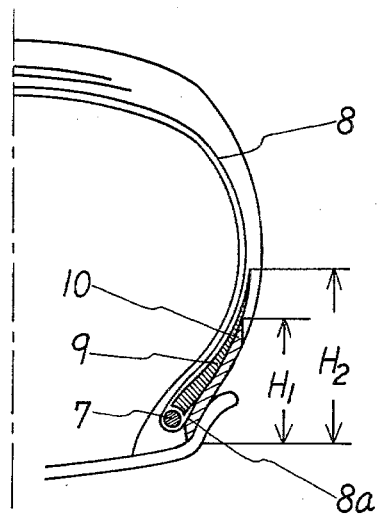
FIG. 2 is a partial section view of a radial tire according to the present invention.

Referring to FIG. 2, carcass ply 8 has its ends turned up outwardly from the inside of bead wire 7, and also the cords of the carcass ply 8 are arranged in the radial direction of the tire. Between the carcass ply 8 and its turned-up end portion 8a is disposed a bead filler rubber 9 which extends from a location just above the bead wire 7 toward the side wall. According to this arrangement, the rigidity of the tire increases gradually from the side wall portion of the flex zone toward the beam portion, and thereby the cushioning effect during rolling on the road surface is further enhanced and the riding comfortability of the tire is improved. Further, because of extremely high dynamic modulus of elasticity of the bead filler rubber 9, there takes place no separation at the turned-up end portion of the carcass ply nor cracking in the radial direction at the bead.

In the present invention, it is desirable to dispose a clinch-apex 10 outside the bead filler rubber 9 as shown in FIG. 2. The clinch-apex usually used is of the type which has a hardness intermediate between those of the side wall rubber and the bead filler rubber, that is, a JIS hardness of 60° to 80°, preferably 70° to 74° according to Japanese Industrial Standard K 6301 for preventing separation of the bead filler 9 having a high hardness and the turned-up end portion of the carcass ply which is disposed just outside the bead filler. The height ($H_1$) of the clinch-apex is usually within the range of 45 to 75% of the height ($H_2$) of the bead filler rubber. By providing such a clinch-apex, the separation at the turned-up end portion of the carcass ply and the cracking at the bead can be further prevented.

The present invention is more particularly described and explained by means of the following Examples, in which all parts are by weight.

EXAMPLES 1 and 2 and COMPARATIVE EXAMPLES 1 to 5

A rubber composition was prepared by milling natural rubber and ingredients shown in Table 1 by a Banbury mixer. After measuring the Mooney viscosity and scorch time, the composition was press-cured at 160° C. for 30 minutes to give a rubber sheet, and the dynamic modulus of elasticity of the cured rubber sheet was measured.

The results are shown in Table 1.

The dynamic modulus of elasticity was measured at room temperature by a viscoelasticity spectrometer made by Kabushiki Kaisha Iwamoto Seisakusho on the strip-shaped specimens having a length of 25 mm., a width of 4 mm. and a thickness of 1.5 mm. by vibrating them at a frequency of 10 Hz with 2% dynamic strain in the state that the specimens were stretched 5% under static strain.

TABLE 1

|  | Ex. 1 | Ex. 2 | Com. Ex. 1 | Com. Ex. 2 |
|---|---|---|---|---|
| Composition (part) |  |  |  |  |
| Natural rubber | 100 | 100 | 100 | 100 |
| HAF black | 70 | 70 | 70 | 70 |
| Aromatic oil | 3.35 | 3.35 | 3.35 | 3.35 |
| Thermosetting resin*1 | 20 | 20 | 20 | 20 |
| Sulfide resin*2 | 2.0 | 4.0 | — | — |
| Antioxidant*3 | 1.0 | 1.0 | 1.0 | 1.0 |
| Stearic acid | 2.0 | 2.0 | 2.0 | 2.0 |
| Zinc white | 5.0 | 5.0 | 5.0 | 5.0 |
| Sulfur | 1.5 | 1.5 | 3.6 | 4.0 |
| N,N-dithioamine*4 | — | — | — | — |
| Accelerator*5 | 2.5 | 2.5 | 2.5 | 2.5 |
| Hexamethylenetetramine | 2.0 | 2.0 | 2.0 | 2.0 |
| Oxazolidine derivative*6 | 1.0 | 2.0 | — | — |
| Scorch retarder*7 | 0.8 | 0.8 | 0.8 | 0.8 |
| Result |  |  |  |  |
| Mooney viscosity ML1 + 4(130° C.) | 70 | 66 | 77 | 79 |
| Scorch time at 130° C. (min.)*8 | 5 | 5 | 6 | 6 |
| Dynamic modulus (kgf./cm.²) | 1760 | 1880 | 1890 | 2010 |

|  | Com. Ex. 3 | Com. Ex. 4 | Com. Ex. 5 |
|---|---|---|---|
| Composition (part) |  |  |  |
| Natural rubber | 100 | 100 | 100 |
| HAF black | 70 | 70 | 70 |
| Aromatic oil | 3.35 | 3.35 | 2 |
| Thermosetting resin*1 | 20 | 20 | 10 |
| Sulfide resin*2 | — | — | — |
| Antioxidant*3 | 1.0 | 1.0 | 1.0 |
| Stearic acid | 2.0 | 2.0 | 2.0 |
| Zinc white | 5.0 | 5.0 | 5.0 |
| Sulfur | 1.5 | 1.5 | 3.0 |
| N,N-dithioamine*4 | — | 4.0 | — |
| Accelerator*5 | 2.5 | 2.5 | 2.5 |
| Hexamethylenetetramine | 2.0 | 2.0 | 1.0 |
| Oxazolidine derivative*6 | — | 4.0 | — |
| Scorch retarder*7 | 0.8 | 0.8 | — |
| Result |  |  |  |
| Mooney viscosity ML1 + 4(130° C.) | 73 | 75 | 75 |
| Scorch time at 130° C. (min.) | 6 | 5 | 10 |

TABLE 1-continued

| | | | |
|---|---|---|---|
| Dynamic modulus (kgf./cm.$^2$) | 1630 | 1970 | 520 |

(Note)
*[1]Thermosetting resin commercially available under the commercial name "Sumilite Resin PR 12686" made by Sumitomo Durez Co., Ltd.
*[2]Sulfide resin having the formula:

$$HO\!-\!\underset{}{\underset{OH}{\bigcirc}}\!-\!\left[\underset{C_8H_{17}}{\underset{OH}{\bigcirc}}\!-\!CH_2\!-\!\underset{C_8H_{17}}{\underset{OH}{\bigcirc}}\!-\!S_2\right]_{2-4}\!-\!\underset{C_8H_{17}}{\underset{OH}{\bigcirc}}\!-\!CH_2\!-\!\underset{}{\underset{OH}{\bigcirc}}\!-\!OH$$

and commercially available under the commercial name "T-110 Resin" made by Sumitomo Chemical Co., Ltd.
*[3]Condensate of diphenylamine and acetone commercially available under the trademark "Nocrac B: made by Ouchi Shinko Chemical Industrial Co., Ltd.
*[4]N,N-dithioamine commercially available under the trademark "Valnoc R" made by Ouchi Shinko Chemical Industrial Co., Ltd.
*[5]Accelerator commercially available under the trademark "Nocceler MSA" made by Ouchi Shinko Chemical Indusrtrial Co., Ltd.
*[6]Oxazolidine derivative having the formula:

$$\begin{array}{c} CH_2OH \\ | \\ O\!-\!N\!-\!O \\ \diagdown\!\!\diagup \end{array}$$

*[7]Scorch retarder commercially available under the trademark "Santogard PVI" made by Monsanto Co.
*[8]Scorch time measured at a rise by 10 points by employing a Mooney viscometer made by Shimadzu Corporation As apparent from Table 1, the sulfide resin blended rubber compositions of the present invention are appreciably low in Mooney viscosity and improved in processability as compared with conventional rubber compositions and also have a satisfactory scorch time such that workability is not impaired. Further, the dynamic modulus of the cured rubber obtained from the composition of the invention is almost equal to those of the cured rubbers obtained from the compositions of Comparative Examples 1 and 2 containing sulfur in a larger quantity and of Comparative Example 4 containing N,N-dithioamine. Moreover, the compositions of the present invention were markedly improved in blooming as compared with the compositions of Comparative Examples 1 and 2.

EXAMPLE 3

Compositions were prepared according to the formulations of Example 1 and Comparative Example 5. The uncured rubbers so obtained were employed as the bead filler rubber 9 of steel radial tires having a tire size of 165 SR 13 and a sectional construction as shown in FIG. 2 to give a radial tire of the present invention and a conventional radial tire. The thus obtained uncured tires were then cured in a usual manner.

The running test of the tires was carried out on a drum having a diameter of 1.7 m. under constant conditions to determine the distance till cracking occurred at the bead. The tire of the present invention showed durability of 3.3 times that of the conventional tire.

EXAMPLE 4

Composition was prepared according to the formulation of Example 1, and press-cured at 160° C. for 30 minutes. The cured rubber so obtained was employed as the bead filler rubber 9 of a steel radial tire having a tire size of 175 SR 14 and a sectional construction as shown in FIG. 2.

Lateral rigidity and cornering force of the tire were measured by employing a deflection machine and a cornering machine under conditions of 1.7 kg./cm.$^2$ in inner pressure and 350 kg. in load. The lateral rigidity and cornering force indexes were 121 and 108, respectively, to those of the conventional radial tire obtained in Example 3 which was regarded as 100, and it was confirmed that the operation stability was considerably improved.

EXAMPLE 5

A radial tire of the present invention and a conventional radial tire were prepared in the same manner as in Example 3, and the riding comfortability thereof was tested under conditions of 1.7 kg./cm.$^2$ in inner pressure and 300 kg. in load in the following manner.

A tire to be tested was attached to a laboratory suspension, and a drum provided with projections having a semidiameter of 10 mm. was rotated at a speed of 40 km./hour. Vertical reaction force imposed to a shaft for fixing tire at the time when the tire gone over the projections was measured to determine the amplitude of the first period from the original wave form (hereinafter referred to as "P-P value") and the decay time. The P-P value and decay time indexes were 109 and 112, respectively, to those of the conventional tire regarded as 100, and it was observed that the riding comfortability was remarkably improved.

What we claim is:

1. A radial tire comprising a carcass ply composed of cords arranged in the radial direction of tire, the both end portions of the carcass ply being turned up at a bead to fasten, and a bead filler being positioned between the carcass ply and the turned-up end portion thereof and extending from a location just above a bead wire toward the side wall of the tire, said radial tire being improved in that said bead filler is made of a cured composition comprising (1) at least one rubber selected from the group consisting of natural rubber, a diene rubber and a diene copolymer rubber, (2) a sulfide resin as a curing agent having the following general formula:

$$Y^1\!-\!\left[\underset{R^1}{\underset{OH}{\bigcirc}}\!-\!X\!-\!\underset{R^2}{\underset{OH}{\bigcirc}}\!-\!S_p\right]_n\!-\!Y^2$$

wherein X is methylene group, ethylene group, —S— or —S—S—, $R^1$ and $R^2$ are independently a $C_{1-10}$ alkyl or alkylene group, $Y^1$ and $Y^2$ are independently the residue of a phenol compound, p is an integer of 2 to 8, and n is an integer of 2 to 5, (3) a phenolic thermosetting resin and (4) a hardener for hardening said thermosetting resin.

2. The radial tire of claim 1, wherein said bead filler extends to the central portion of the side wall with a gradually decreasing thickness of the bead filler.

3. The radial tire of claim 1, further comprising a clinch-apex having a height of 0.45 to 0.75 time the height of the bead filler, said clinch-apex being positioned at the outside in the axial direction of the turned-up end portion of the carcass ply in close vicinity thereto.

* * * * *